United States Patent
Le Scouarnec et al.

(10) Patent No.: US 9,357,000 B2
(45) Date of Patent: May 31, 2016

(54) METHOD FOR PROVIDING INCENTIVE MECHANISMS FOR OUT-OF-ORDER DOWNLOAD IN COMMUNICATION NETWORKS DEDICATED TO THE DISTRIBUTION OF VIDEO-ON-DEMAND CONTENT

(75) Inventors: Nicolas Le Scouarnec, Liffre (FR); Mary-Luc Champel, Marpire (FR)

(73) Assignee: Thomson Licensing (FR)

( * ) Notice: Subject to any disclaimer, the term of this patent is extended or adjusted under 35 U.S.C. 154(b) by 460 days.

(21) Appl. No.: 13/138,336

(22) PCT Filed: Feb. 3, 2010

(86) PCT No.: PCT/EP2010/051296
§ 371 (c)(1),
(2), (4) Date: Mar. 13, 2012

(87) PCT Pub. No.: WO2010/094561
PCT Pub. Date: Aug. 26, 2010

(65) Prior Publication Data
US 2012/0167150 A1    Jun. 28, 2012

(30) Foreign Application Priority Data

Feb. 17, 2009  (EP) ................................... 09305153

(51) Int. Cl.
*G06F 15/16* (2006.01)
*H04L 29/08* (2006.01)
*H04L 29/06* (2006.01)

(52) U.S. Cl.
CPC .......... *H04L 67/104* (2013.01); *H04L 65/4084* (2013.01); *H04L 65/602* (2013.01); *H04L 67/108* (2013.01); *H04L 67/1082* (2013.01)

(58) Field of Classification Search
CPC ............ H04N 7/173; H04N 21/47202; H04N 7/17318; H04N 21/482
USPC ................................ 709/246, 225, 226, 224
See application file for complete search history.

(56) References Cited

U.S. PATENT DOCUMENTS

2006/0020560 A1    1/2006  Rodriguez et al.
2006/0190615 A1    8/2006  Panwar et al.
(Continued)

OTHER PUBLICATIONS

Vlavianos et al., "BiToS: Enhancing BitTorrent for Supporting Streaming Applicatioins", INFOCOM 2006, 25th IEEE International Conference on Computer Communications, IEEE, Apr. 1, 2006, pp. 1-6.*

(Continued)

*Primary Examiner* — Vivek Srivastava
*Assistant Examiner* — Normin Abedin
(74) *Attorney, Agent, or Firm* — Jack Schwartz & Associates, PLLC

(57) ABSTRACT

The present invention concerns a method of transferring content from a first communication device to a second communication device in a communication network, comprising the following steps:
  defining a first probability, according to which a content can be encoded;
  defining a second probability, according to which a content can be chosen;
  upon request of content from said second communication device to said first communication device:
    encoding content with another content according to said first probability, said content being chosen with said second probability, and transferring content z=x XOR y from said first communication device to said second communication device, or
    according to probability $1-p_e$ transferring unencoded content x from said first communication device to said second communication device.

21 Claims, 12 Drawing Sheets

(56) References Cited

U.S. PATENT DOCUMENTS

2008/0195664 A1* 8/2008 Maharajh et al. .......... 707/104.1
2008/0205291 A1 8/2008 Li et al.
2008/0256615 A1 10/2008 Schlacht et al.

OTHER PUBLICATIONS

Locher et al: "Rescuing Tit-for-Tat with Source Coding", Seventh IEEE International Conference on Peer-to-Peer Computing, 2007, Galway, Ireland, Sep. 2-5, 2007, pp. 3-10.*

Carlsson et al., "Peer-Assisted On-Demand Stream of Stored Media Using BitTorrent-Like Protocols", Networking 2007, Berlin, Heidelberg, May 14, 2007, pp. 570-581.

M-L Champel et al: "Phosphite: Guaranteeing Out-of-Order Download in P2P Video on Demand"; Peer-to-Peer Computing, 2009. P2P '09. IEEE Ninth International Conference, Sep. 9, 2009, pp. 281-290.

Pai et al.: "Improving VoD Server Efficiency with Bittorrent", MM'07 Sep. 28, 2007, retireved from the Internet: URL: http://cobweb.ecn.purdue.edu/{vpai/Publications/choe-mm07.pdf.

Search Report Dated October 18, 2010.

Annapureddy et al., "Providing Video on Demand using Peer-to-Peer Networks", p. 1-14, Internet Protocol Television Workshop, 2006.

Chang et al., "An Open Systems Approach to Video on Demand", IEEE Communications Magazine, May 1994, p. 68-80.

Silverston et al., Towards an Incentive Mechanism for Peer-to-Peer Multimedia Live Streaming Systems, Eigth International Conference onPeer-to-Peer Computing, IEEE Computer Society, 2008, p. 125-128.

Suh et al., "Push-to-Peer Video-on-Demand System: Design and Evaluation", IEEE Journal on Selected Area in Communications, vol. 25, No. 9, Dec. 2007 p. 1706-1716.

* cited by examiner

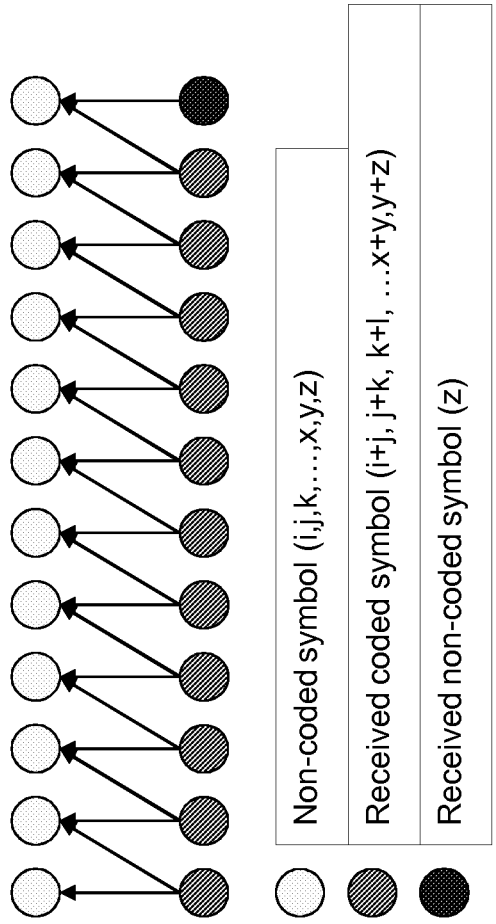

US 9,357,000 B2

METHOD FOR PROVIDING INCENTIVE MECHANISMS FOR OUT-OF-ORDER DOWNLOAD IN COMMUNICATION NETWORKS DEDICATED TO THE DISTRIBUTION OF VIDEO-ON-DEMAND CONTENT

This application claims the benefit, under 35 U.S.C. §365 of International Application PCT/EP2010/051296, filed Feb. 3, 2010, which was published in accordance with PCT Article 21(2) on Aug. 26, 2010 in English and which claims the benefit of European patent application No. 09305153.0, filed Feb. 17, 2009.

FIELD OF THE INVENTION

The present invention relates to the field of communication networks.

The present invention more particularly relates to hybrid peer-to-peer (P2P)/Content Delivery Network (CDN) architectures dedicated to distribution of Video-on-Demand (VoD) content.

BACKGROUND OF THE INVENTION

In architectures of hybrid peer-to-peer (P2P)/Content Delivery Network (CDN) type, peers cooperation (using P2P) is used in order to minimize the load over the CDN. Each peer tries to download data from other peers and relies on the CDN only if the data cannot be found among the peers it is connected to. For the peer-to-peer mechanism to be efficient, data persistence must be ensured although peers join and leave the network frequently. Typically, a peer joins the network when a user requests to watch the video, remains in the network while downloading and playing the video and finally, soon after having played the whole video, it leaves the network and stops serving data.

The present invention particularly concerns VoD (Video on Demand) which differs from a pure download and from streaming. Indeed, with VoD, the whole file is available somewhere while it is played and every peer starts to play the video at a different time and therefore is interested in different blocks of the file. It obviously differs from streaming where content is generated on the fly and where all peers are interested in the same blocks at the same time. VoD also differs from pure file download as content blocks need to be downloaded so that the video can be played while download is still in progress. However, a P2P system needs randomness among content blocks download in order to be efficient and every efficient download protocol downloads files out-of-order in order to ensure that every chunk is replicated an equal number of time and can be served efficiently. Therefore, while a VoD download protocol is based on in-order download, for efficiency's sake it is clear that it may also benefit from so called "out-of-order" download.

As peer-to-peer systems are open systems where each peer plays an important role in the system, they are subject to selfish and malicious behaviors where peers do not cooperate as specified but try to maximize their own interest. In the current VoD case, a peer may try to download all the content in order to minimize the chance that it misses a block. However, selfish behavior hurts the global performance as if every peer is selfish and downloads in order; the P2P system will not ensure data persistence for the last blocks of the video.

In order to prevent selfish behaviors, P2P protocols are enhanced with incentive mechanisms that ensure that peers have to behave as predicted. Otherwise, their performance would be reduced. One of the most known incentives is Bittorrent's "tit for tat" that is intended at ensuring that every peer contributes to the system. In the present invention, the inventors have designed an incentive that ensures that every peer dedicates a part of its bandwidth to out-of-order download while keeping a sufficient effort on in-order download. This is some kind of trade-off between global efficiency of the whole P2P system and local quality of service for all peers.

FIG. 1 shows a peer-to-peer network comprising eight peers connected to a CDN (Content Delivery Network).

P2P (peer-to-peer) goals and VoD (Video on Demand) goals are somehow orthogonal. In a P2P system, one wants peers to download data randomly (out-of-order) to ensure that each chunk is available on an equal number of peers. The out-of-order download helps to ensure persistence of data even in highly dynamic environments. Therefore, the whole system benefits from out-of-order download. However, peers playing a video downloaded by P2P VoD want to download the video blocks in order. They need data to be available on time. In order to reduce the risk of missing deadlines, the best strategy is to download data in order: the peer downloads first the data it needs first. Therefore, individually, each peer benefits from in-order download.

The conflict between global and individual interest hurts persistence of data, especially for the last blocks. Indeed, peers only serve last blocks for a very short time. Peers tend to leave the application once they have played the video and just after having downloaded the last blocks. Therefore, the CDN (Content Delivery Network) will permanently need to re-inject the last blocks in the system as peers cannot help each other for the last few blocks.

Peer-to-peer systems are generally open and subject to arbitrary behavior. Therefore, solutions that can be bypassed by modification of the local behavior are not acceptable. The present invention offers a solution that can enforce peers to use their spare bandwidth to download content out of order. The goal is to ensure that a peer's individual interest is not opposed to the system's global interest.

Although there are currently no known solutions to the above-mentioned problem, there are solutions to similar problems where a peer wants to ensure that another peer owns some data before delivering a service.

The solution generally proposed involves cryptographic challenges and require cryptography to be deployed and the protocol to be made more complex to handle such challenges. Moreover, the deployment of cryptography in distributed systems requires a central trusted authority for managing and delivering keys. Unfortunately, such solutions are weakened by the fact that the central trusted authority quickly becomes a bottleneck in P2P systems.

Other solutions involve a form of auditing where a third party requests the data to the peer being audited and sends the result to the auditing peer. However, to prevent any form of cheating, this strategy requires complex protocols and use of cryptography with the same problems as in the previous case.

SUMMARY OF THE INVENTION

The present invention aims at solving the above-mentioned drawbacks that are present in the solutions of the prior art.

The present invention proposes a simple yet efficient mechanism to ensure a minimum of out-of-order download. The basic idea is to encode content with a probability $p_e$ before sending it. The encoding is preferably based on parity erasure-correcting codes so that, when content x is requested, it may be encoded with another content y, which is chosen with probability $p_c$, before sending x+y to another peer.

Therefore, with such mechanism, the peers which requested x and received x+y needs to get the content y before being able to decode and use x. Of course, while content x is part of in-order download, the need to download content y is itself introducing out-of-order download. This simple policy is efficient and secure. Various possibilities exist for the probability laws $p_e$ (probability of introducing encoding) and $p_c$ (probability of choosing a given block to encode originally requested block with).

We note x+y for x XOR y here. However, one could use other type of erasure correcting codes (other than parity codes).

The present invention can also be described as an application of Vernam cipher (One Time Pad cipher) with the key being another (future) block we want the other peer to download. The block is encoded (ciphered) with probability $p_e$ and the probability $p_c$ defines the way the key is chosen. The other peer will have to download the other block (the key) to be able to decode (decipher) data encoded with Vernam cipher. Therefore, the peer is forced to download the other block which is the key.

According to the present invention, an incentive is built for solving the previously-mentioned problem on this principle.

The present invention is defined, in its broader sense, as a method of transferring content from a first communication device (D1) to a second communication device (D2) in a communication network, comprising the following steps:
- defining a first probability ($p_e$), according to which a content can be encoded;
- defining a second probability ($p_c$), according to which a content can be chosen;
- upon request of content (x) from said second communication device (D2) to said first communication device (D1):
  - encoding content (x) with another content (y) according to said first probability ($p_e$), said content (y) being chosen with said second probability ($p_c$), and transferring content z=x XOR y from said first communication device (D1) to said second communication device (D2), or
  - according to probability $1-p_e$ transferring unencoded content x from said first communication device (D1) to said second communication device (D2).

Advantageously, the encoding is based on parity erasure-correcting codes.

According to an embodiment, said first probability ($p_e$) is a constant.

According to an embodiment, said first probability ($p_e$) has the following form: $p_e = c - ax$, where x is the requested content and where a and c are constants.

According to an embodiment, said first probability ($p_e$) has the following form: $p_e = c + ax$, where x is the requested content and where a and c are constants.

According to an embodiment, said first probability ($p_e$) has the form of a Gaussian function.

According to an embodiment, said first probability ($p_e$) has the following form: $p_e = p_e(x,p) = c - a/(x-p)$, where x is the requested content, p is the content being played, and where a and c are constants.

According to an embodiment, said first probability ($p_e$) depends on the variation of quantity of buffered data.

According to an embodiment, said second probability ($p_c$) is used to implement a rarest first policy.

According to an embodiment, said second probability ($p_c$) is uniform.

The present invention provides at least the following advantages:
It is a simple and efficient solution.
It does not require any complex cryptographic mechanism/infrastructure.
There is no way to bypass the mechanism according to the present invention.

BRIEF DESCRIPTION OF THE DRAWINGS

The following detailed description will be better understood with the Drawings, in which:

FIG. 10 shows a structure of a protocol message;

FIG. 11 illustrates a Tanner-graph of the code resulting of the use of the Incentive;

DETAILED DESCRIPTION OF THE
EMBODIMENTS OF THE INVENTION

In a sense, the present invention relates to a method of transferring content from a communication device D1 to another communication device D2 in a communication network.

Figure 12:
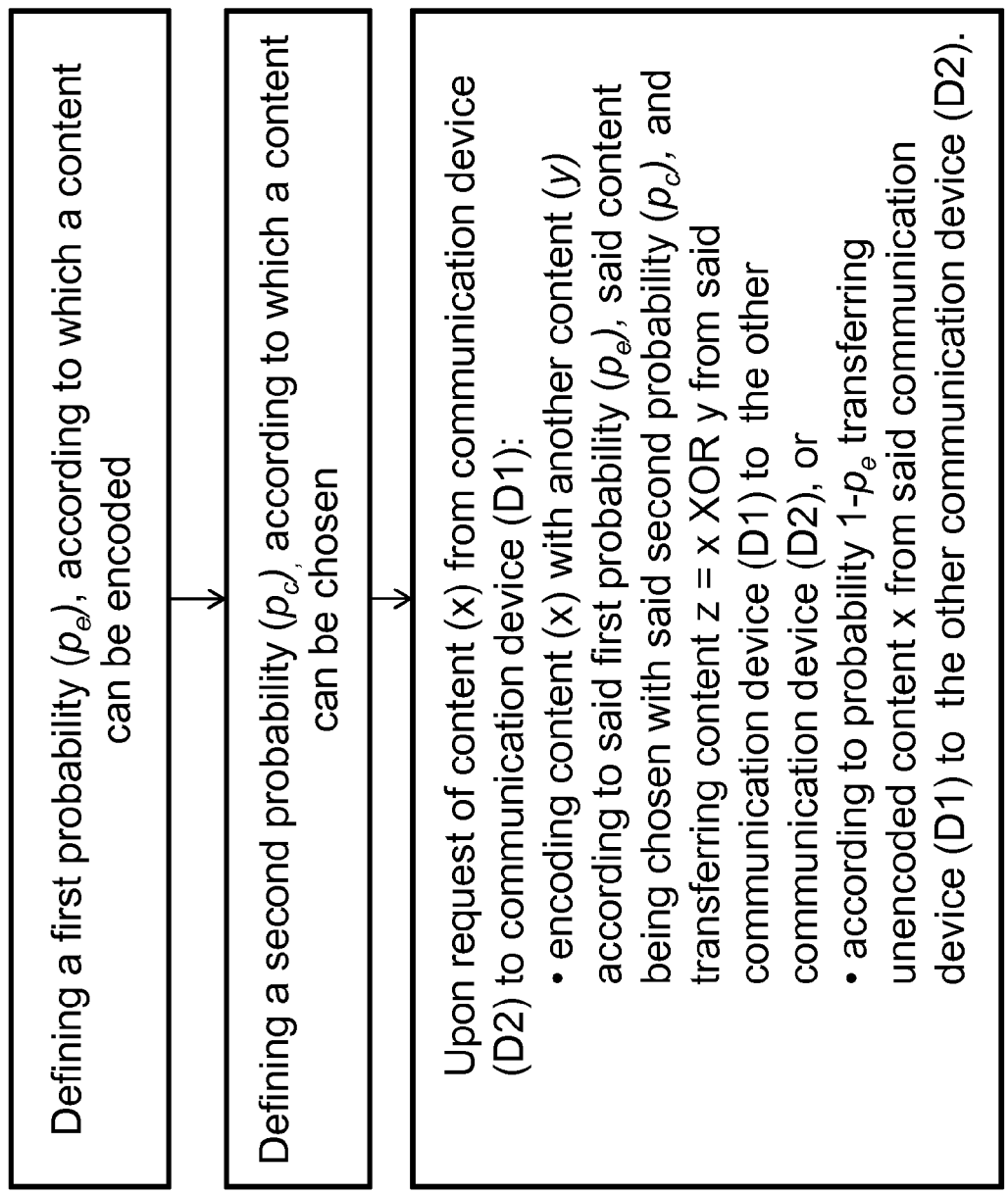
FIG. 12 is a flow-chart representing the method according to the present invention.

The method according to the present invention is illustrated on FIG. 12.

In the following detailed description, we consider a peer-to-peer communication network comprising a plurality of communication devices (peers).

Figure 13:
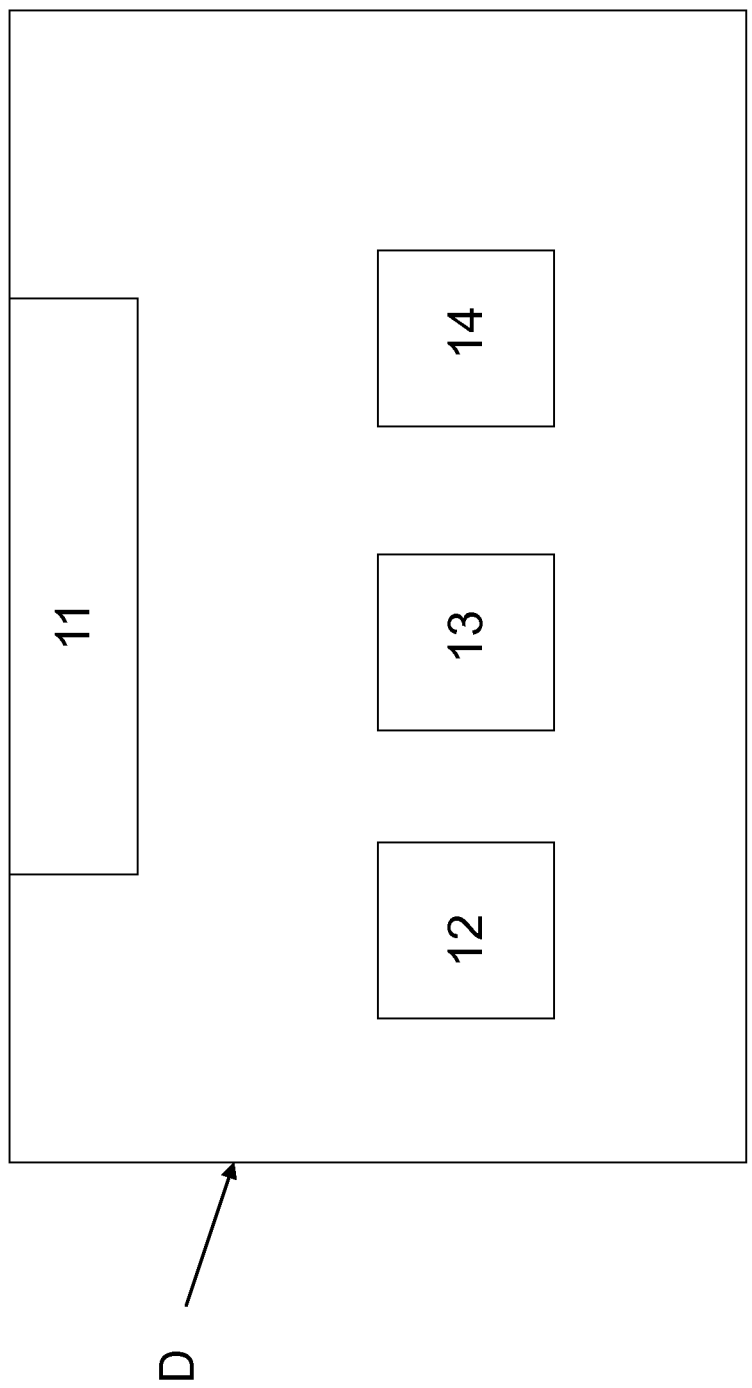
FIG. 13 shows an example of a communication device (peer) as used in the context of the present invention.

The communication device D (a peer) shown on FIG. 13 comprises a communication interface 11, a processor 12, a volatile memory 13 and a non-volatile memory 14.

The processor 12, the volatile memory 13 and the non-volatile memory 14 are used for storage and processing.

Figure 1:
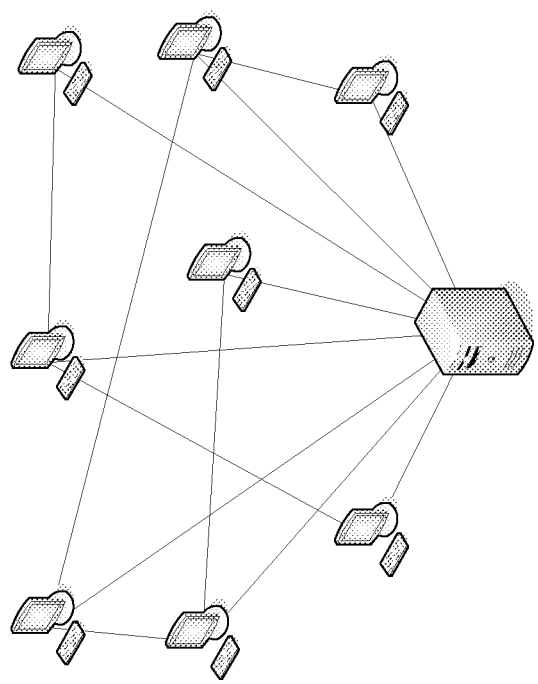
FIG. 1 shows a peer-to-peer network comprising eight peers connected to a CDN (Content Delivery Network)
Figure 2:
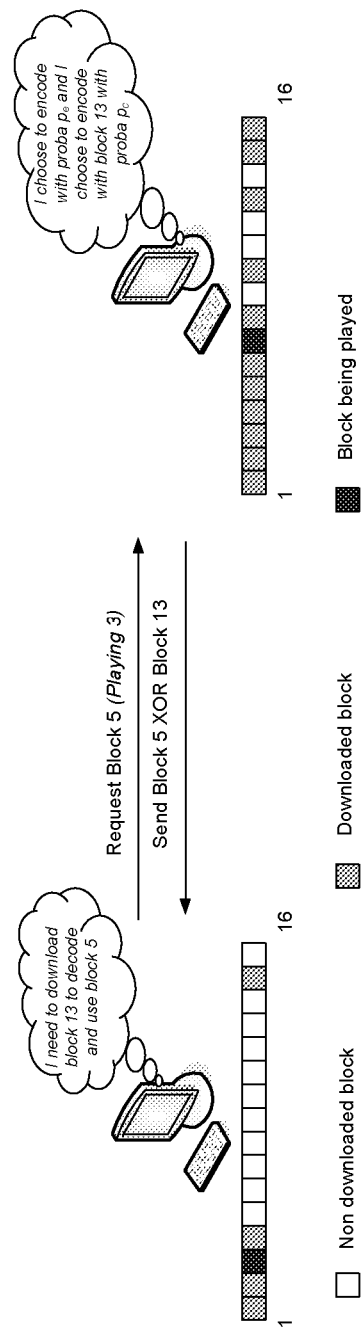
FIG. 2 shows a small exchange when a peer downloading a block is forced to download (out-of-order) another block.
Figure 3:
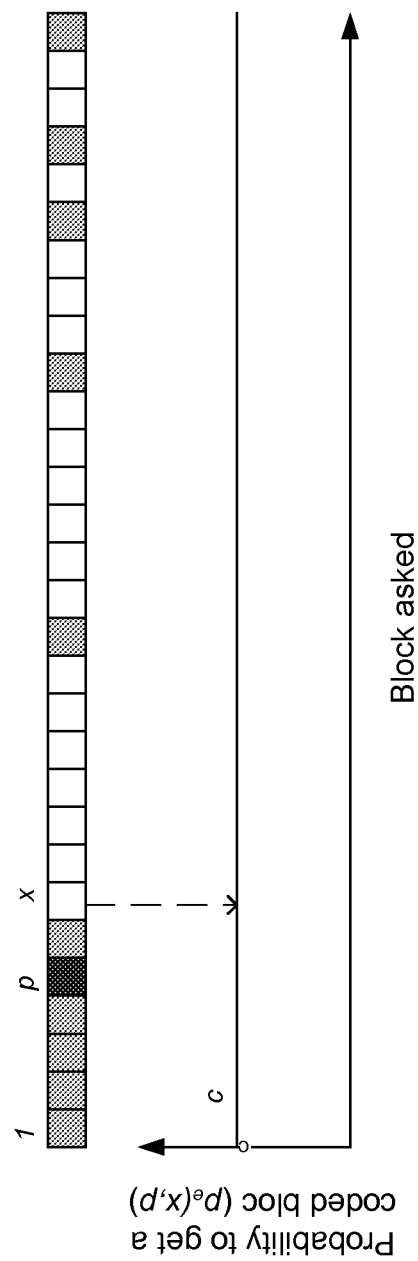
FIGS. 3 to 9 illustrate various strategies for $p_e$ (probability to get a coded block/block asked)

The present invention focuses on how peers behave when replying to another peer's requests. FIG. 2 shows a small exchange when a peer downloading a block 5 is forced to download (out-of-order) a block 13. In the rest of this specification, a video file compound of L blocks is considered.

First, when asked a block x by a peer d (demander), a peer s (server) chooses with some probability $1-p_e$ to send x and not to force the other peer to download out-of-order. Otherwise, with a probability $p_e$, it sends x+y and forces the other peer to download out-of-order. The probability $p_e$ may depend on the block being played (p) or/and on the block being asked (x). Various strategies for $p_e$ will be defined later.

The block y is of course an already available block on peer s and is always such that y>x (meaning: the position of block y in the file is further than the position of block x). Moreover, the probability to choose such y block may depend on x, y and p. We will define later various strategies for $p_c$.

The peer d receiving a block x+y after asking x can be in three situations:
It already has downloaded y and consequently it can decode x immediately. The fact that it has y, which was chosen randomly, indicates that it has already downloaded a part of the content out-of-order and that it does not behave selfishly.

It does not have y and therefore it now has to request the download of y. As for any download request, it may receive y or y+z. If it receives y, it can decode (x=(y+x)+y), otherwise, it proceeds recursively to download z if needed. Eventually, the peer receives a non-encoded block and is able to decode all blocks it has received since its first block request. By choosing $p_e$ reasonably low, the number of download iterations (and additional blocks to decode) remains very low.

The peer ignores that it did not receive x and received x+y and tries to cheat with the system by requesting x again. Such behavior would be a malicious behavior. The peer may be punished by downloading x+y again as it will not help in decoding.

Note that since a block is always encoded with a later block, the last block (L) is always served immediately and never encoded when it is directly requested.

Various strategies for $p_e$ or $p_c$ are detailed below. Some extensions that make the incentive more robust and resilient to some simple statistical analysis that could help an attacker to bypass the incentive are also reviewed. A simple decoding algorithm for the resulting received encoded blocks is also presented.

FIGS. 3 to 9 illustrate various strategies for $p_e$ (probability to get a coded block/block asked).

Strategies for $p_e$ $p_e$ is the probability that a peer chooses to send encoded content (forcing the other peer to download out-of-order content before using data) rather than requested content. For instance, if $p_e$ is set to 10%, about 11,11% (10%+10% of 10% + . . . ) of the downloads would be out-of-order downloads. The parameter impacts directly the length of the chain of encoded blocks (x+y, y+z, z+v,v) and therefore, the number of blocks that need to be downloaded before decoding x. To ensure downloading, peers will be able to download all blocks required to decode before they reach their deadlines, the parameter $p_e$ must be chosen carefully. Indeed, the value must not be set too high, otherwise the peer will notice many failures in the beginning of the download. Since the chain will be too long, the peer will dedicate a too important part of its bandwidth to out of order download.

1) Constant $p_e$. $p_e(x,p)=c$. We will generally choose $c<<\frac{1}{2}$.

This simple protocol is quite efficient. The amount of content downloaded out of order can easily be approximated with the sum of the geometric series of parameter $p_e$. For instance, $p_{e=\frac{1}{4}}$, it means that $\approx \frac{1}{3}$ of the content is downloaded out-of-order and for $p_{e=\frac{1}{10}}$, it means that $\approx \frac{1}{9}$ of the content is download out-of-order.

Advantages:
Simple to set up as there is only one parameter to set.
Efficient even with this simple setting as long as $p_e$ is well chosen.
If $p_e$ is well chosen, converges quickly so that the blocks from the end of the file are quickly replicated Disadvantages:
Peers are forced to download a lot of content out-of-order in the beginning, when their buffers are not filled a lot and when they might miss their playing deadline as chains of encoded symbols are too long
Peers are not forced to download content out of order once they reach the middle of the movie, while they have more bandwidth available to dedicate to out of order download once their buffer is more filled This is illustrated on FIG. 3.

2) Decreasing $p_e$. $p_e(x,p)=c-ax$. We will generally choose $c<<\frac{1}{2}$ and $a \leq 1/L$.

This strategy aims at removing the disadvantages of the previous one. Indeed, it reduces the length of the chains of blocks as after x is requested and x+y is received, when y is later requested, the probability to get an encoded block (y+z) is much lower as y is greater (much greater) than x. Long story short, the more the requested block is close to the end of the file, the higher the probability of this block to be directly served is.

Advantages:
This strategy tends to produce chains of encoded blocks shorter than in the strategy 1.

Disadvantages:
After the first minutes of the download, the peers are not forced to download out-of-order as much as they can. This strategy is even worse than strategy 1 for this.

Figure 4:
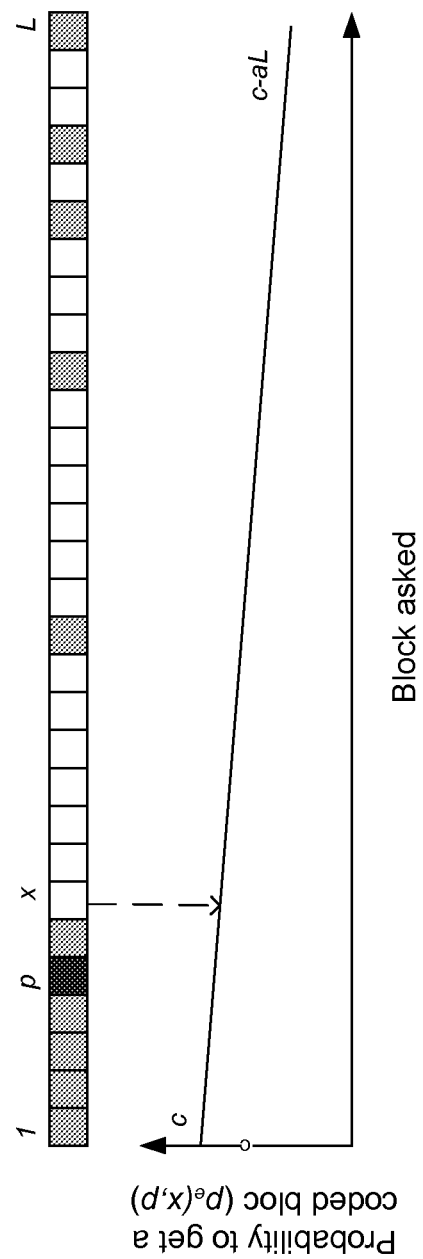

This is illustrated on FIG. 4.

3) Increasing $p_e$. $p_e(x,p)=c+ax$. We will generally choose $c<<\frac{1}{2}$ and $a<(1-c)/L$ Advantages
Peers are not forced to download content out of order in the beginning of the download.
Peers are more forced to download a lot of content out of order in the middle and in the end of the download when they can.

Disadvantages
As the probability of getting an encoded block increases when a block index increases, the chains of encoded block tend to be long even though chains are rare in the beginning. Therefore, the peer may miss its deadline.

Figure 5:
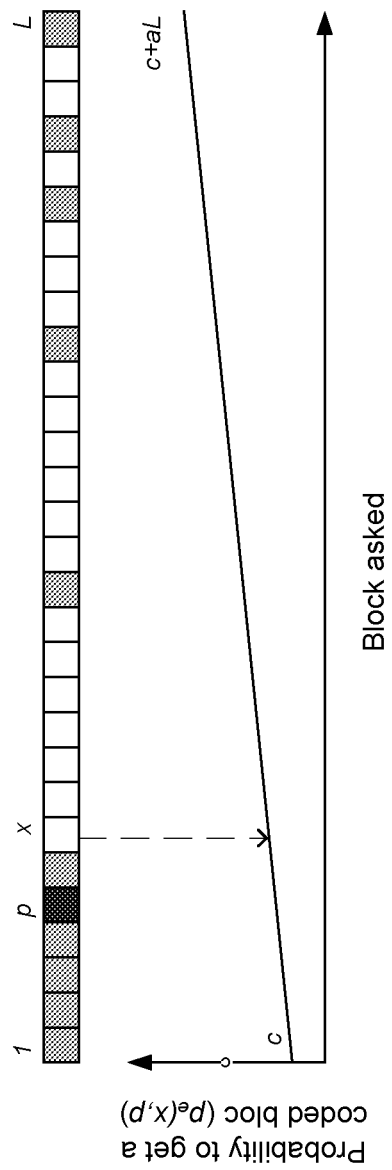

This is illustrated on FIG. 5.

4) Gaussian policies, increasing and then decreasing (triangular) policies, staircases policies, might also be used.

Such strategies allow peers to start their download without being forced to download out-of-order and then they are progressively forced to download out of order content. However, when a block close to the end is asked it is not recombined. Therefore, chains of coded block remain short while peers are forced to download more.

Advantages
Peers are not forced to download too early, chains remains short and peers are forced to download out of order a lot in the middle.

Disadvantages
This strategy is more complicated to set up as there are more parameters that are involved but such disadvantage is probably low compared to the gain.

Figure 6:
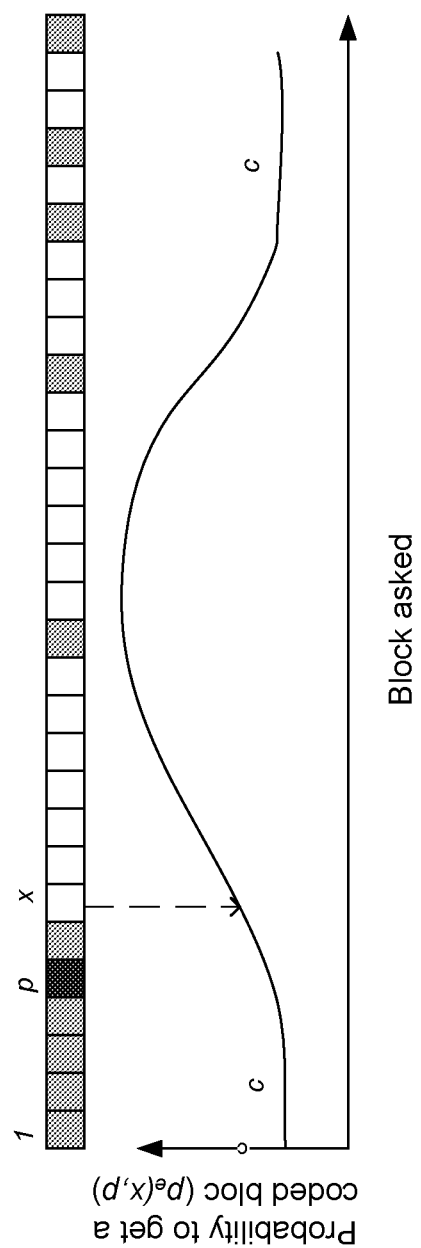

This is illustrated on FIG. 6.

5) Policies with a hole in the middle, decreasing and then increasing (triangular or staircase) policies may also be used.

Such strategies allow disabling the incentive during the period for which peers tend to fail in downloading blocks on time. This policy is efficient as it continues to force peers to download in the beginning, relax the constraints and then increase the constraints when approaching the end.

Advantages
Peers are not forced to download during the period where they could observe a lot of missed blocks. Chains remain short and peers are forced to download out of order a lot in the beginning or the end.

Disadvantages
This strategy is more complicated to set up as there are more parameters that are involved but such disadvantage is probably low compared to the gain.

The two next policies depend on information provided by the peer. This information allows to take into account the position of the block relative to the current playing position. The peer may lie about the information it provides in order to bypass the incentive. However, it is possible to add another mechanism that allows detecting most of the peers that lie and blacklist them.

Figure 7:
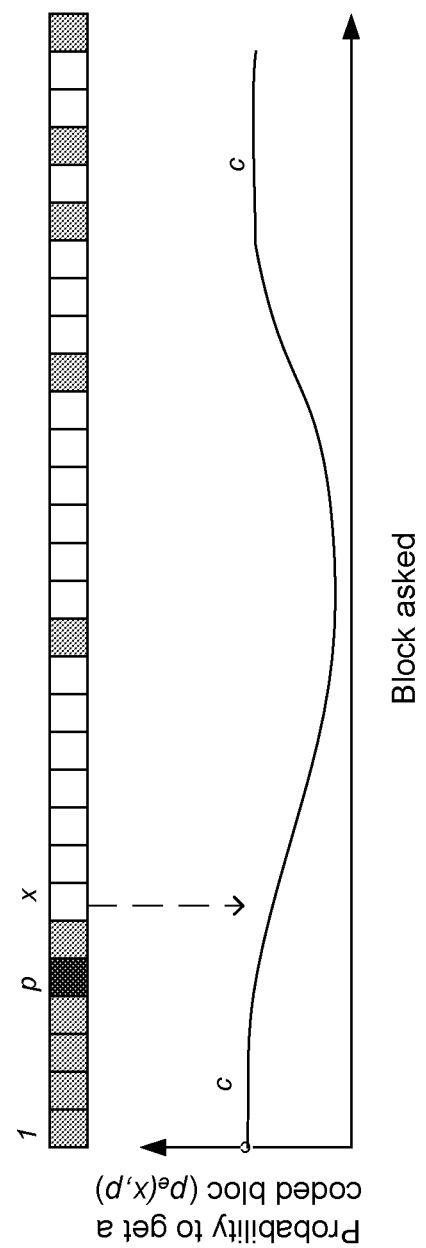

This is illustrated on FIG. 7.

6) Depending on block being played $p_e$. $p_e(x,p)=c-a/(x-p)$. With $a<c$. With this rule, the probability of getting a coded block decreases when the distance between the block asked and the block played decreases. Therefore, one avoids getting coded blocks when too close to its deadline since encoded content would require another download and may result in missing the deadline.

Advantages

The addition of another mechanism to prevent peers from cheating about p remains simple.

This system can directly prevent from forcing a peer to download out of order if it becomes close to its deadline.

Disadvantages

This enhancement only has an impact on the first request. If the request is the second on the chain, the probability will not be reduced (as y will be largely after p), even if in fact y is needed to decode x that is really close to p.

This strategy is less robust than the previous ones that did not rely on information provided by other peers.

Robustness of the Incentive

This rule makes the incentive less aggressive but it exposes the incentive to peers cheating by lying about their value p of the block being played.

One such mechanism could ensure that peers do not cheat by forbidding them to decrease the value p and to request block z<p. Therefore, if a peer lies it cannot download blocks that are before the value p it claimed when it lied.

One such mechanism could be based on the very same idea the incentive is based on. The peer that serves can reasonably encode (XOR) data with any block which index is lower than p as they should have been downloaded and played. Therefore, the data the other peer will receive will be either $x+b_i$ or $x+y+b_i$ with i≤p. i will be chosen so that it will be in a "small" window before p. This could potentially be based on a uniform distribution (i is chosen uniformly between 0 and p) or an harmonic distribution: p with proba ½, p-1 with proba ¼, p-i with proba $½^{(i+1)}$. The goal of such a distribution is to ensure that the cheating peer cannot choose the value p it report so that it knows the value $b_p$ as it may also be checked for knowing $b_{p-1}$, $b_{p-2}$, . . . . However, it ensures that we check mostly value that are close to p, to ensure that the peer is not cheating. Indeed, with a uniform distribution, even when cheating by adding ⅓ to the value of p, the probability that we will be punished is only ¼ which may be a bit low (however, uniform can work as adding ⅓ to p is not very much in the beginning and a lying peer would probably add more than ⅓).

Figure 8:
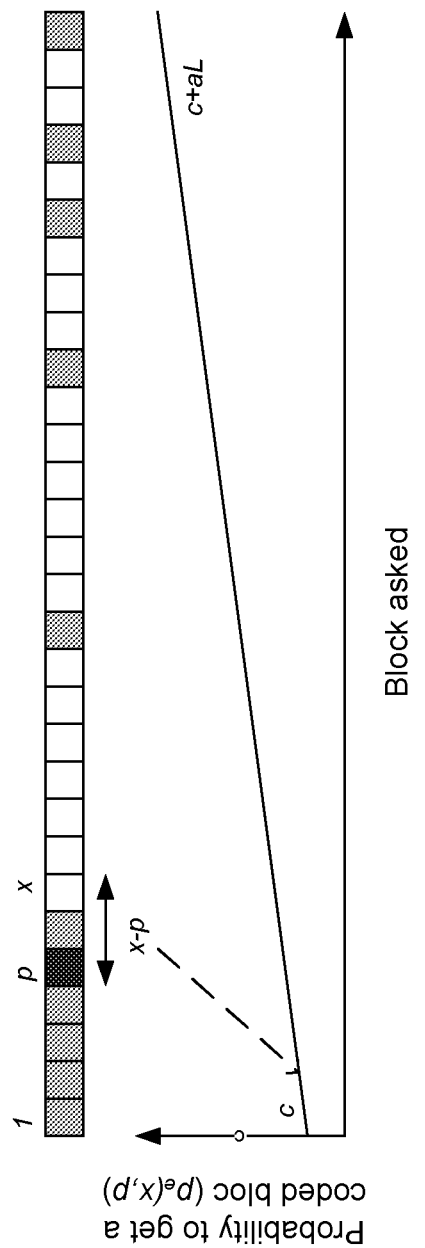

This is illustrated on FIG. 8.

7) Depending on the variation of quantity of data buffered $p_e$.$p_e(x,\Delta)$.

This strategy relies on information provided by the peer. The peer will compute the variation of its buffering over the last T seconds. The peer computes $\Delta_t=b_t-b_{t-T}$, where $b_t$ is quantity of consecutive data that is already downloaded and ready to be played after the current playing position p at time t. It corresponds to the number of blocks between the playing position and the first missing block at time t.

It allows the incentive to adapt to heterogeneous system where bandwidth available at peers varies.

Advantages

This strategy allows preventing from forcing a peer that is in danger of missing its deadline to download content out-of-order.

This strategy has an impact on any element of the chain be it x or y.

Disadvantages

Peers can cheat and bypass the incentive mechanism.

The mechanism requires another mechanism that checks that peer do not lie and this mechanism cannot be as simple as in the previous case.

Robustness of the Incentive

This rule makes the incentive less aggressive but it exposes the incentive to peer cheating about their value $\Delta_t$ and reporting a low value. Therefore, when used, this strategy must be combined with a mechanism that checks that peers do not lie.

Figure 9:
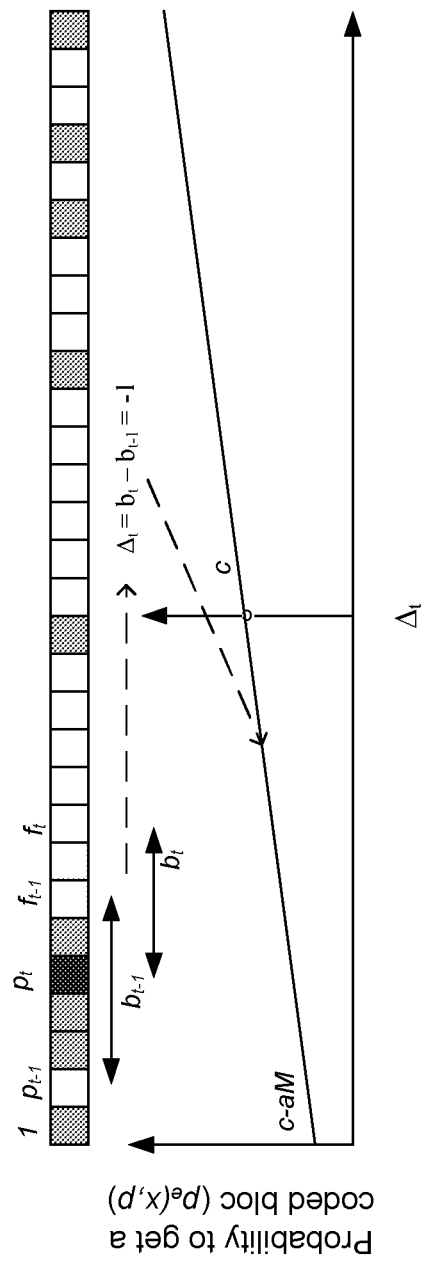

This is illustrated on FIG. 9.

Strategies for $p_c$ $p_c$ specifies which data a peer chooses to send when encoding content. The probability is defined as p(y,x,p), which is the probability of encoding x with y when the peer claims it plays p and when we have already chosen to encode x with some other block. It clearly appears that this probability might be the same for all values of y or that it could change to force peers to download the middle or the end of the file.

Note that the y takes their value in the set T={x+1, x+2, . . . , L} ∩ AvailableBlocks(s) where AvailableBlocks(s) is the set of blocks available on peer s that is answering the request. The sum of the p(y,x,p) over T must be equal to 1

$$\left(\sum_{y \in T} p(y, x, p) = 1\right).$$

Therefore, computing p(y,x,p) may require normalization.

Various strategies may be:

1) $p_c$ uniform as in: $p_c(y,x,p)=1/|T|$ (All blocks have the same probability to be chosen)

Advantages

This strategy is simple and require no communication between peers

The decision process is much more simple and does not require complex computation Disadvantages The policy chooses randomly and may not converge quickly to equalize replication of all blocks. Indeed, frequent blocks (blocks present on many peers) tend to be XORed with other peers data more frequently than the rare blocks that are present on only one peer. Therefore rare blocks stay rare and frequent blocks become even more frequent.

2) $p_c$ may be used to implement a rarest first policy. The peer s chooses to xor with the rarest block using a local rarest first policy. The local part means that it looks at the peers it knows and chooses the rarest block among advertised blocks. The local rarest first policy is already used with success in another context in Bittorrent (When a peer chooses to ask a block of data, it always asks the rarest first).

Advantages

This policy converges quickly to equal replication of all blocks

No block can become rare as if it becomes too rare, it will quickly be replicated on other peers.

Disadvantages

It requires each peers to know and maintain knowledge about the content available on neighbors. However, this will probably be the case, as Bittorrent like protocols are such that peers know the content available on their neighbors The computation of which block is the rarest is a bit more complex than a pure random choice. However, it remains reasonable as we only consider a "local" rarest first and compute the rarity on a subset of the peers.

3) $p_c$ may be used to choose to xor with data peer d does not already have. This requires s to know the blocks available on d. However, this is always the case in Bittorrent-like protocols. It allows ensuring that peers effectively download out-of-order and avoiding recombining with data that the distant peer d already know.

Advantages

It allows constantly forcing the other peer to download content out of order

It avoids to encode and decode uselessly

Disadvantages

This strategy exposes the incentive to cheating. Indeed, a peer may tell that it has the whole content except the block it needs. Therefore, data is not encoded and the cheating peer is able to download the content in order. However, peers cheating can be punished by not being allowed to download content they already have advertised.

It requires the peer s to always have the information about which blocks are available on each peer.

4) A combination of these policies may be used. For example, we may combine 2 and 3 and introduce some randomness in the choice.

The way the present invention deals with peers which are cheating with the incentive, is as follows:

First, classical "generic" attacks on distributed systems such as sibyl attacks or collusion attacks will have no impact on the incentive as new comers are not granted any advantages and false cooperation cannot provide advantages to colluders. Therefore, any attacks must be specifically designed for the incentive. We think that the incentive, once extended (with a symmetrical ciphering scheme) to prevent the attack using a statistical analysis, is quite robust and cannot be bypassed.

Carefully Choosing Peers

A first strategy to cheat could be to choose carefully the peers to which data is requested by always requesting data from the peer that have the less content available in the future, or so that we already have most of the block the other peer have. Therefore, the number of encoded symbols will be smaller, and encoded symbols will always be encoded with the same symbols.

However, peers will not be able to continue doing so forever, as they will miss block that are not available on peers that do not have a lot of content. Moreover, if many peers start cheating that way, the few peers with not much content will be overloaded and will not serve request fast enough. Eventually, when using a Local Rarest First choice as the rule for choosing the block to encode with, the block will tend to be encoded with exactly the block the requester does not have do not already have, rendering such attack inefficient.

Therefore, the incentive cannot be bypassed this way.

Avoiding Statistical Analysis

This extension is a non-essential addition to the protocol. However, it remains interesting as it ensures that the incentive cannot be bypassed by a simple statistical analysis. Indeed, one could guess if another peer is sending encoded or non-encoded content by requesting the same content from three peers. Then, it would observe the beginning of the blocks it receives. Finally, it will choose to download a block such that the beginning of this block is the same as the one of another block that we are receiving. The two other requests will be cancelled.

This strategy would be successful as when encoding with a constant probability $p_e$=0.1, the probability that at least two of the three peers send the same non-encoded content is p=0.972. Therefore, 97% of the requests will correctly indicate which peers send non-encoded data.

As a simple solution to punish cheating peers, peers may identify peers that cancel a lot of their requests (either by sending a CANCEL message or by closing the TCP connection) and blacklist them. In the present case, 2 out of 3 requests will be cancelled which is much higher than for a peer that does not try to abuse the system. However, global blacklist are not practical in large scale peer to peer systems and local blacklist allows a cheating peer to simply contact another peer when it gets blacklisted. If it can contact enough peers, it will be able to bypass blacklisting.

A more robust solution consists in preventing such analysis. First, data is ciphered with a symmetrical cipher (any symmetrical cipher will be useful) so that an attacking peer cannot guess which content is non-encoded by comparing the beginning of the blocks of data it receives. The key for deciphering the received block will be appended at the end of the block so that a peer must download the whole block before deciphering, decoding and using the received ciphered block. As a result, a peer will not be able to compare the first blocks to decide if it can close a connection.

The structure of a protocol message is illustrated on FIG. 10.

If a peer gets information about the data (such as headers indicating that data is encoded) early, it can close the connection when detecting that data being sent is encoded. Therefore, we must use a "footer" instead of an header.

Ideally, one would send the data first, and append the id of the blocks that are being sent and the key to decode the data at the end of the protocol message. Moreover, one would ensure that all protocol messages have the same size be they encoded data or non-encoded data. The goal of this unusual organization of protocol message is to prevent any form of analysis that could help an attacker to guess the nature of the content before having downloaded the full data.

However, variant of the protocols may organize the data in any other way even though it would probably expose the protocol to attackers.

Decoding Procedure

The particular structure of the code turns decoding into a low complexity procedure. Indeed, as we always encode a requested symbol x with a symbol y coming later in the data, we have a chain of coded symbol (a+b,b+c,c+d,e+f, . . . i+j,j) that ends with a non-coded symbol.

FIG. 11 shows a Tanner-graph of the code resulting of the use of the Incentive.

Here is the description of such decoding algorithm.

Let's note $m_a$ the memory storage for data of symbol a. We allow storing any data in $m_a$ during the decoding, but we want to make sure that data in $m_a$ will be the symbol a once the data is decoded. We propose here a simple in-place decoding method that is a de-generated version of a belief propagation decoding algorithm applied to LDPC (Low density parity codes). Our code is low density as the degree is either 1 or 2. We note $*m_x$=y to indicate that we store y in the memory storage for x (address $m_x$).

The only data structure needed to decode the code is a stack. We have two operations on a stack: push, which adds data onto the stack, and pop which picks and remove the last piece of data added on the stack.

In a few words, the principle of the algorithm is to push on stack all decoding operation to be done until the last symbol of the chain is discovered. Then, we simply perform the XOR operation in reverse order to decode.

More formally, the decoding algorithm is the following. When we receive a symbol, we act differently depending on which it is. Suppose we request x.

If we receive x, we store $*m_x=x$. Then, if the decoding stack is non empty, we call the decoding procedure.

If we receive x+y,
    We store $*m_x=x+y$
    We do push $(m_x, m_y)$ on the stack.
    If we already know y value,
        We call the decoding procedure.
    Otherwise,
        We ask y
            This procedure is called recursively (we may receive y, or y+z, and process them appropriately).

The decoding procedure is the following:
If the stack is empty, the decoding is complete
Else, we perform $(m_a, m_b)$=pop from the stack.
    We compute $*m_a = *m_a + *m_b$.
    Indeed, as $m_b$ is already decoded and $*m_a = a+b$, it is equivalent to $*m_a = (a+b) + b = a$.
    It also shows that using something more powerful than parity codes is not needed. Even if it works, it will only increase encoding and decoding complexity without enhancing performance.

The above specification, examples and drawings provide a complete description of the method according to the present invention. Since many embodiments of the invention can be made without departing from the spirit and scope of the invention, the invention resides in the claims herein after appended.

The invention claimed is:

1. A method of transferring content including a plurality of blocks from a first communication device to a second communication device in a communication network, comprising: defining, by a processor of said first communication device, a first probability pe, in which $0<pe<1$, according to which each of the plurality of blocks can be encoded; defining, by the processor of said first communication device, a second probability Pc, according to which each of the plurality of blocks can be chosen; receiving a request, by a communication interface of said first communication device from the second communication device via the communications network, for one of the plurality of blocks x; and according to said first probability Pe, encoding, by the processor of said first communication device, said requested block x with a second block y, said second block y being chosen, by the processor of said first communication device, with said second probability Pc, and transmitting, via the communication interface, a third block z, with z=x XOR y from said first communication device to said second communication device via the communications network, according to a probability 1−pe, transmitting, via the communication interface, said requested unencoded block x from said first communication device to said second communication device via the communications network.

2. Method of transferring content according to claim 1, wherein the encoding is based on parity erasure-correcting codes.

3. Method of transferring content according to claim 1, wherein said first probability $p_e$ is a constant.

4. Method of transferring content according to claim 1, wherein said first probability $p_e$ has the following form: $p_e=c-ax$, where x is the requested block and where a and c are constants.

5. Method of transferring content according to claim 1, wherein said first probability $p_e$ has the following form: $p_e=c+ax$, where x is the requested block and where a and c are constants.

6. Method of transferring content according to claim 1, wherein said first probability $p_e$ has the form of a Gaussian function.

7. Method of transferring content according to claim 1, wherein said first probability $p_e$ has the following form: $p_e=p_e(x,p)=c-a/(x-p)$, where x is the requested content, p is the content being played, and where a and c are constants.

8. Method of transferring content according to claim 1, wherein said first probability $p_e$ depends on the variation of quantity of buffered data.

9. Method of transferring content according to claim 1, wherein said second probability $p_c$ is used to implement a rarest first policy.

10. Method of transferring content according to claim 1, wherein said second probability $p_c$ is uniform.

11. A method of transferring content including a plurality of blocks from a first communication device to a second communication device in a communication network, comprising: defining, by a processor of said first communication device, a first probability pe, in which $0<pe<1$, according to which each of the plurality of blocks can be encoded; defining, by the processor of said first communication device, a second probability Pc, according to which each of the plurality of blocks can be chosen; receiving a request, by a communication interface of said first communication device from the second communication device via the communications network, for one of the plurality of blocks x and according to said first probability Pe, encoding, by the processor of said first communication device, said requested block x with a second block y, said second block y being chosen, by the processor of said first communication device, with said second probability Pc, and transmitting, via the communication interface, a third block z, with z=x XOR y from said first communication device to said second communication device via the communications network, according to a probability 1−pe, transmitting, via the communication interface, said requested unencoded block x from said first communication device to said second communication device via the communications network wherein said first probability Pe has the following form: $Pe=Pe(X, p)=C-a/(x-p)$, where x is the requested block, p is a content being played, and where a and c are constants.

12. A communication device for transferring content including a plurality of blocks to a second communication device in a communication network, comprising: a communication interface for connecting the communication device to the communication network; a memory for storing the content; a processor configured to: defining a first probability pe, in which $0<pe<1$, according to which each of the plurality of blocks can be encoded; defining a second probability Pc, according to which each of the plurality of blocks can be chosen; upon receipt of a request of a block x by a communication interface of from the second communication device; according to said first probability Pe, the processor encodes said requested block x with a second block y, said second block y being chosen by the processor with said second probability Pc, and the communication interface transmits a third block z, with z=x XOR y from the memory to said second communication device via the communications network, according to a probability 1−pe, the communication interface transmits said requested unencoded block x from the memory to said second communication device via the communications network.

13. The device according to claim 12, wherein the encoding is based on parity erasure-correcting codes.

14. The device according to claim 12, wherein said first probability $p_e$ is a constant.

15. The device according to claim 12, wherein said first probability $p_e$, has the following form: $p_e = c + ax$, where x is the requested block and where a and c are constants.

16. The device according to claim 12, wherein said first probability $p_e$ has the following form: $p_e = c + ax$, where x is the requested block and where a and c are constants.

17. The device according to claim 12, wherein said first probability $p_e$ has the form of a Gaussian function.

18. The device according to claim 12, wherein said first probability $p_e$ has the following form: $p_e = p_e(x, p) = c - a/(x-p)$, where x is the requested block, p is a content being played, and where a and c are constants.

19. The device according to claim 12, wherein said first probability $p_e$ depends on a variation of quantity of buffered data.

20. The device according to claim 12, wherein said second probability $p_c$ is used to implement a rarest first policy.

21. The device according to claim 12, wherein said second probability $p_c$ is uniform.

* * * * *